March 2, 1965

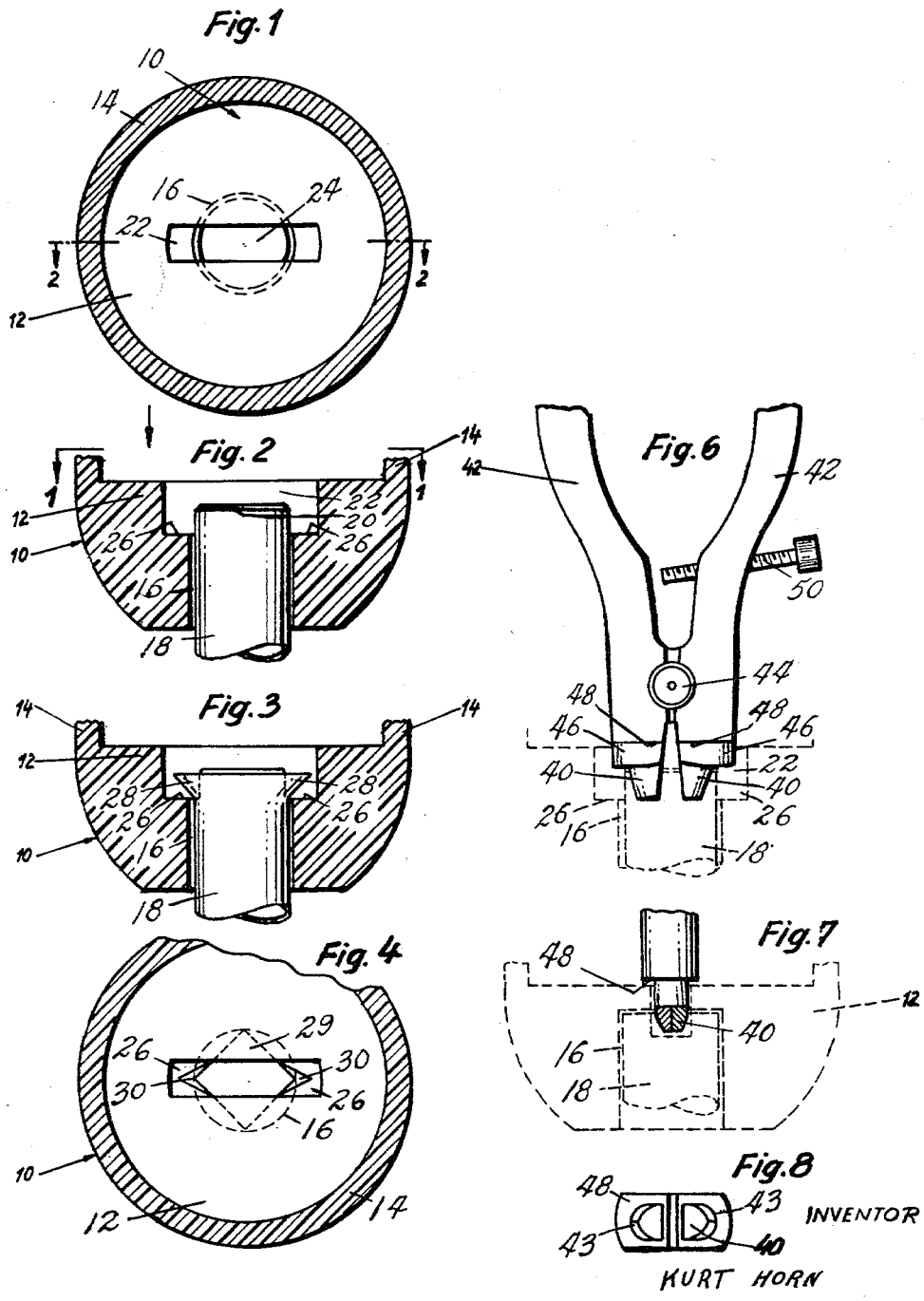

K. HORN 3,171,676

FIXTURE FOR ATTACHMENT WITH ELECTRIC
CONDUITS, CABLES AND THE LIKE

Filed Feb. 24, 1961

INVENTOR
KURT HORN

BY *Burgess Dinklage Sprung*
ATTORNEYS

United States Patent Office 3,171,676
Patented Mar. 2, 1965

3,171,676
FIXTURE FOR ATTACHMENT WITH ELECTRIC CONDUITS, CABLES AND THE LIKE
Kurt Horn, Mettmann, Rhineland, Germany, assignor to VLM W. Murjahn K.G., Mettmann, Rhineland, Germany, a corporation
Filed Feb. 24, 1961, Ser. No. 91,550
Claims priority, application Germany, Feb. 25, 1960, V 18,127
3 Claims. (Cl. 285—222)

This invention relates to fixtures for connection with electric conduits, cables and the like.

In connecting pipes, conduits, sheath cables and the like to fixtures, such as lamp socket bases, junction boxes or other terminals, the problem is to provide a connection which is solid enough to insure that the connection will not loosen so as to put strain onto the electrical conductor contained in the conduit and connected at the fixture with other conductors. Set screws and other frictional means for establishing such connections in one way or another are apt to loosen by vibration, jarring or other conditions and produce a dangerous condition.

It is an object of this invention to provide a construction and form of connection which will be simple to install and easy to disconnect, if so desired.

Other objects and advantages of the invention will be in part obvious and in part pointed out hereinafter.

In the drawing, illustrating a preferred embodiment of the invention,

FIG. 1 is a transverse section of a fixture provided with the invention, taken along the line 1—1 of FIG. 2 looking in the direction of the arrows;

FIG. 2 is a longitudinal section of the fixture, taken along the line 2—2 of FIG. 1;

FIG. 3 is a section, also along the line 2—2 of FIG. 1, showing the end of the attached conduit spread to engage the fixture;

FIG. 4 is a transverse section, similar to FIG. 1, showing a square conduit inserted in a round aperture in the fixture and with the conduit wall expanded for gripping purposes;

FIG. 6 is a side view of a spreading tool adapted to deform the ends of a conduit to grip the fixture;

FIG. 7 is a side view of the tool shown in FIG. 6, only the ends of the jaws being illustrated; and FIG. 8 is an end view of the tool at its spreading jaws.

Figure 5:
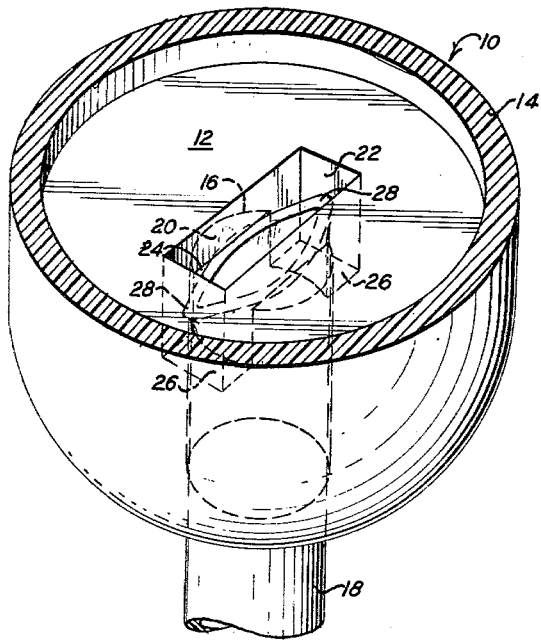
FIG. 5 is an isometric view of the fixture of FIG. 1 showing the relationship of parts more clearly.

For illustration, the invention is shown as applied to a socket base and pipe to be connected thereto, such as would be used for containing wires or other electrical conductors commonly used. The fixture 10 is provided with a wall 12, and in this instance a peripheral end 14 extends therefrom for attachment to a suitable structure, such as a lamp socket and the like (not shown). Extending from one face of the wall 10, in this instance the bottom, there is provided an apertures 16 which may conform to the shape of a pipe or conduit 18 to which the fixture 10 is to be connected. Aperture 16 extends only part of the way into wall 12 and provides an abutment 20 for the end of pipe 18.

From the opposite face of wall 12 a second aperture 22 extends part of the way into wall 12, but is only partly in registry with aperture 16, so that pipe 18, although abutting the end of aperture 16, is enough in registry to provide a hole as shown at 24, through which the electrical conductors may pass.

While the second aperture 22 may assume a variety of shapes, as will be obvious, in this instance it is in section a rectangular slot, central with respect to aperture 16 though somewhat longer than the diameter of that aperture. Intersection of the two apertures forms a pair of shoulders 26 adjacent aperture 16 at which the adjacent walls of pipe 18 are adapted to be expanded, as shown in FIG. 3, to form ears 28, gripping wall 12 at shoulders 26. Thus, pipe 18 is held solidly in position with respect to wall 12.

In FIGS. 1 to 3 inclusive, pipe 18 has been shown cylindrical. A square or other form of pipe may also be attached to wall 12, as indicated in FIG. 4, wherein the corners of square pipe 29 are spread, as shown at 30, to grip shoulders 26 for securing the pipe in position. It is preferable that pipe 29 conform in some measure to the contour of aperture 16, in this instance the diameter of that aperture shown to be substantially equal to the diagonal of the square pipe.

FIG. 5 is an isometric view looking into the top or large peripheral end 14 of the fixture 10, and shows wall 12 with the first aperture 16, slot or recess, i.e., second aperture 22, the stop or abutment 20, and the shoulders 26, provided therein, as well as the end of conduit 18 adjacent the stop or abutment 20 expanded at ears 28 into the recess 22 and over the shoulders 26, such that the hole 24 is sufficient for passing the electrical conductors through wall 12 thereat from one side of fixture 10 to the other.

A suitable tool for forming the ears 28 and 30 of pipes 18 and 29 is shown in the face view in FIG. 6 and comprises a pair of jaws 40 at the forward end of hand-gripping shank portions 42 and pivoted on a pin 44, so that on pressing portions 42 together jaws 40 spread apart. Jaws 40 are provided with reduced portions 46 of suitable widths to be received into slot 22, and in addition each jaw 40 has a shoulder 48 of suitable width to prevent jaws 40 from extending beyond the shoulder 26 at the bottom of slot 22. The distance between shoulder 48 and the end of jaws 40 is such that no damage can be produced by the spreading of the jaws with respect to the aperture 16.

As indicated in FIGS. 7 and 8, jaws 40 may have a pointed outer edge 43 which makes deformation of the pipe 18 easier. As shown in FIG. 6, a limiting screw 50, threaded in through one of portions 42 to engage the other such portion, may be provided as an adjustment to limit the amount of spreading of the ends of pipe 18. The connection thus produced has the advantage that all of the fastening operation is produced from inside the arrangement and, where the fixture is intended to have some ornamental value, there are no ugly protuberances to detract from its appearance. The construction is rigid, the pipe cannot turn with regard to the part to which it is attached, and thus there is a very considerable safety factor involved.

Thus, by the above construction there are accomplished among others the objects hereinbefore referred to.

I claim:

1. A fixture for attachment with a conduit, pipe, cable and the like, including a wall provided at one side with means defining an aperture extending longitudinally part way thereinto to receive an end of such conduit, means defining a second aperture extending longitudinally from the opposite side thereinto part way to intersect the first said aperture means and only partly in registry therewith yet providing direct communication between said first and second aperture means thereat, stop means extending medially between said first and second aperture means at the point of intersection of said second aperture means with said first aperture means and obstructing transversely a portion of the cross-section of said first aperture means, means defining opposed shoulders in said wall at said first aperture means at a point longitudinally spaced from said point of intersection and said stop means and situated longitudinally between said point of intersection and said one side of said wall and extending in said wall peripherally outwardly of said first aperture means and said stop means, and correspondingly opposed recess means defined in said wall peripherally outwardly of said first aperture means and said stop means and overlying correspondingly the opposed shoulder means and extending longitudinally from said second aperture means to said shoulder means, said shoulder means facing said second aperture means and being positioned in direct longitudinal communication therewith via the corresponding recess means peripherally outwardly of said first aperture means and said stop means, whereby said second aperture means will permit expansion therein at said recess means of portions of the end of such conduit and the like when situated longitudinally between said shoulder means and said stop means.

2. A fixture and conduit connection comprising a conduit, and a fixture including a wall provided at one side with means defining a first aperture extending longitudinally part way thereinto, an end of said conduit being received in the first aperture means, means defining a second aperture extending longitudinally from the opposite side thereinto part way to intersect said first aperture means and only partly in registry therewith yet providing direct communication between said first and second aperture means thereat as well as communication between said second aperture means and the end of said conduit in said first aperture means, stop means extending medially between said first and second aperture means at the point of intersection of said second aperture means with said first aperture means and obstructing transversely a portion of the cross-section of said first aperture means and in turn a portion of the cross-section of the conduit end thereat, means defining opposed shoulders in said wall at said first aperture means at a point longitudinally spaced from said point of intersection and said stop means and situated longitudinally between said point of intersection and said one side of said wall and extending in said wall peripherally outwardly of said first aperture means and said stop means, and correspondingly opposed recess means defined in said wall peripherally outwardly of said first aperture means and said stop means and overlying correspondingly the opposed shoulder means and extending longitudinally from said second aperture means to said shoulder means, said shoulder means facing said second aperture means and being positioned in direct longitudinal communication therewith via the corresponding recess means peripherally outwardly of said first aperture means and said stop means, said end being positioned in said first aperture means longitudinally between said stop means and said shoulder means and portions of said end being swaged transversely over the corresponding shoulder means at said recess means in spreading engagement therewith to secure said conduit to said fixture and to prevent twisting of said end with respect to said first aperture means and unintentional removal of said end from said first aperture means.

3. A fixture and conduit connection according to claim 2, wherein said conduit has a predetermined cross-sectional shape and said first aperture means conforms to the shape of said conduit to permit said end to be received therewithin.

References Cited by the Examiner
UNITED STATES PATENTS

| | | | |
|---|---|---|---|
| 600,988 | 3/98 | Hayes | 285—330 |
| 673,971 | 5/01 | Bartliff | 285—382.5 |
| 779,896 | 1/05 | Wood | 285—382.5 |
| 940,870 | 11/09 | Gordon | 285—382.4 |
| 964,208 | 7/10 | Burns | 285—382.4 |
| 1,410,482 | 3/22 | Langer | 285—128 |
| 1,539,388 | 5/25 | Franz | 29—512 |
| 1,738,915 | 12/29 | Mueller | 285—382.4 |
| 1,908,020 | 5/33 | Hulsart | 285—382.4 |
| 2,263,714 | 11/41 | Bloomfield | 29—523 |
| 2,379,804 | 7/45 | Johnson | 29—512 |
| 2,650,735 | 9/53 | Redmond | 29—512 |
| 2,695,446 | 11/54 | Meyer | 29—523 |
| 2,848,255 | 8/58 | Klein | 285—321 |

CARL W. TOMLIN, *Primary Examiner.*